Figure 1:
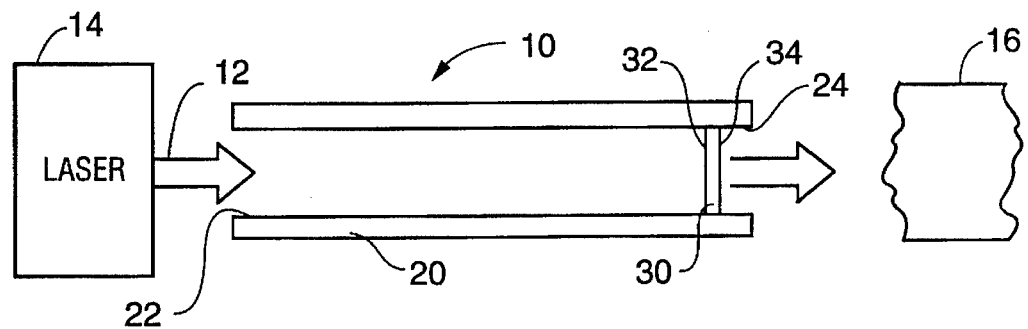

United States Patent [19]
Trost

[11] Patent Number: 5,625,638
[45] Date of Patent: Apr. 29, 1997

[54] SEALED CRYSTALLINE WINDOWS FOR HOLLOW LASER FIBERS

[75] Inventor: David Trost, San Francisco, Calif.

[73] Assignee: Coherent, Inc., Santa Clara, Calif.

[21] Appl. No.: 327,886

[22] Filed: Oct. 24, 1994

Related U.S. Application Data

[63] Continuation of Ser. No. 69,299, May 28, 1993, abandoned.

[51] Int. Cl.$^6$ ........................................................ H01S 3/08
[52] U.S. Cl. ............................................ 372/103; 385/109
[58] Field of Search ........................ 372/103; 385/109, 385/133, 902, 117, 119; 606/2, 2.5, 15

[56] References Cited

U.S. PATENT DOCUMENTS

| | | | |
|---|---|---|---|
| 3,430,158 | 2/1969 | Fox et al. | 372/103 |
| 3,466,565 | 9/1969 | Rigrod | 372/99 |
| 3,467,098 | 9/1969 | Ayres | 128/303.1 |
| 3,471,800 | 10/1969 | Congleton et al. | 372/99 |
| 3,471,802 | 10/1969 | Caulfield | 372/99 |
| 3,546,622 | 12/1970 | Peterson et al. | 372/20 |
| 3,609,586 | 9/1971 | Danielmeyer | 372/99 |
| 3,993,965 | 11/1976 | Alves et al. | 331/94.5 T |
| 4,008,945 | 2/1977 | Schere | 359/513 |
| 4,122,853 | 10/1978 | Smith | 128/303.1 |
| 4,182,547 | 1/1980 | Siegmund | 385/119 |
| 4,229,069 | 10/1980 | Motin et al. | 385/119 |
| 4,266,549 | 5/1981 | Kimura | 128/303.1 |
| 4,267,828 | 5/1981 | Matsuo | 385/119 |
| 4,273,109 | 6/1981 | Enderby | 606/15 |
| 4,402,569 | 9/1983 | Bow et al. | 606/2 |
| 4,469,098 | 9/1984 | Davi | 128/303.1 |
| 4,649,546 | 3/1987 | Schmid | 359/894 |
| 4,652,083 | 3/1987 | Laakmann | 350/96.32 |
| 4,688,893 | 8/1987 | Laakmann | 350/96.32 |
| 4,800,568 | 1/1989 | Krueger et al. | 372/103 |
| 4,805,987 | 2/1989 | Laakmann et al. | 350/96.32 |
| 4,830,460 | 5/1989 | Goldenberg | 385/118 |
| 4,917,083 | 4/1990 | Harrington et al. | 606/15 |
| 4,950,266 | 8/1990 | Sinofsky | 606/2 |
| 4,963,143 | 10/1990 | Pinnow | 604/14 |
| 5,103,340 | 4/1992 | Dono et al. | 359/578 |
| 5,139,494 | 8/1992 | Freiberg | 606/3 |
| 5,220,453 | 6/1993 | McKinley et al. | 359/614 |
| 5,335,245 | 8/1994 | Marie et al. | 372/103 |

*Primary Examiner*—Rodney B. Bovernick
*Assistant Examiner*—Robert E. Wise
*Attorney, Agent, or Firm*—Limbach & Limbach L.L.P.

[57] ABSTRACT

A device is disclosed for delivering laser radiation to a target. The device includes an elongated, hollow, tubular member having an input end and a delivery end. A window is mounted near the delivery end of the device. The window provides a seal preventing smoke and debris from contaminating the interior of the device. In the preferred embodiment, the window is formed from a crystalline material, such as diamond, which has low absorption level for laser light and excellent thermal characteristics. In addition, the thickness of the window is selected to reduce reflection losses and increase the transmission level through the window without the need for fragile antireflection coatings.

14 Claims, 2 Drawing Sheets

SEALED CRYSTALLINE WINDOWS FOR HOLLOW LASER FIBERS

This is a continuation of application Ser. No. 08/069,299, filed on May 28, 1993, now abandoned.

TECHNICAL FIELD

The subject invention relates to hollow fiber or waveguide channel for delivering laser light. The hollow fiber has a sealed crystalline window and is particularly suited for use in surgical procedures performed in a liquid field.

BACKGROUND OF THE INVENTION

In recent years there has been a significant increase in the use of lasers in medicine. A variety of delivery devices have been developed to couple the light from the laser to the tissue being treated.

One type of delivery device includes a solid, flexible fiber, typically formed from silica. In these devices, the laser light is transmitted along the fiber by total internal reflections off the walls of the fiber.

The other principal type of delivery device consists of a hollow tubular member for channelling the light. The tubular member can be configured as a waveguide with the light reflecting off the internal walls of the tube. Alternatively, the light may be focused in a manner to pass through the tube without substantial contact with the walls.

Hollow delivery devices have certain drawbacks not associated with solid fibers. The most significant drawback is that the internal surfaces of a hollow device can become contaminated by smoke and debris created during a surgical procedure. One common method of reducing this contamination is to direct a flow of purge gas through the device and out the delivery end thereof. By maintaining a positive pressure at the delivery end of the device, it is possible to minimize contamination. As can be appreciated, the use of a purge gas to prevent contamination adds a layer of complexity to the system. Moreover, it is difficult to use such hollow devices under water since the exiting purge gas will create bubbles in the water, disrupting the vision of the surgeon.

A far simpler approach for minimizing contamination would be to seal the end of the hollow device with a window that is transparent to the laser radiation. Unfortunately, this approach has not been easy to implement because it is difficult to design a window which would fulfill all the necessary requirements. More specifically, the window selected must be highly transparent to the laser radiation so that it will not overheat from absorbed laser energy. The window material must also have good thermal conductivity, stability and strength at high temperatures.

The above criteria could all be satisfied by forming the windows from crystalline materials such as sapphire or diamond. These materials are extremely efficient at transferring heat via lattice phonon transmissions. However, these materials tend to have relatively high losses due to reflections at their surfaces. For example, sapphire has a reflection loss in air of approximately eight percent per surface, while diamond has a loss of seventeen percent per surface. As can be appreciated, these losses are too high for practical use.

The common approach for reducing losses due to surface reflections is to coat materials with thin layers of transparent dielectric materials. However, the common dielectric materials used for antireflection coatings are much more fragile than these crystalline compounds and would be easily damaged during use. Thus, it would not be possible to reduce the reflection loss of crystalline windows by using known dielectric coatings in a surgical laser setting.

In the prior art, attempts have been made to use less desirable materials to form a sealed window in a delivery device. For example, in U.S. Pat. No. 4,122,853, a hollow delivery device is disclosed which is sealed with a window formed from zinc selenide. Unfortunately, the properties of zinc selenide, such as its melting point, hardness and thermal conductivity, make zinc selenide a poor choice for all but the lowest laser power levels. There is also a concern that zinc selenide may be toxic and therefore it is a far less desirable material than inert crystalline materials.

Accordingly, it is an object of the subject invention to provide a hollow delivery device having a sealed window which overcomes the problems found in the prior art.

It is a further object of the subject invention to provide a window for a hollow delivery device which is formed from a durable, inert, crystalline material.

It is still another object of the subject invention to provide a sealed window for a hollow delivery device which is configured to reduce the reflection losses at a selected wavelength.

It is still a further object of the subject invention to provide a sealed window for a hollow delivery device which is configured to reduce the reflection losses at a selected wavelength without using dielectric coatings.

It is still another object of the subject invention to provide a sealed window for a hollow delivery device which is configured to reduce the reflection losses at a two different selected wavelengths without using dielectric coatings.

It is still a further object of the subject invention to provide a sealed window for a hollow delivery device which is configured to reduce the reflection losses at 10.6 and 11.1 microns without using dielectric coatings.

SUMMARY OF THE INVENTION

In accordance with these and other objects, the subject invention provides an improved sealed window for a hollow delivery device. The device includes an elongated, hollow, tubular member for channeling light from a laser source to the target. While the subject invention has been developed with surgical applications in mind, the improvements herein could be useful in material processing procedures where contamination of the internal surface of a hollow delivery device has been a problem.

In accordance with the subject invention, a window is mounted in the tubular member, adjacent the delivery end thereof. The window is mounted in a manner to form a seal which prevents contamination of the interior of the tubular member by smoke and debris created during the procedure.

In one aspect of the subject invention, the window is formed from a crystalline material. Suitable materials are sapphire, YAG and diamond. These materials are highly transparent, very hard and have excellent thermal properties.

In a further aspect of the subject invention, the window is configured to minimize reflection losses from its surfaces without using relatively fragile dielectric coatings. This goal is achieved by carefully selecting the thickness of the window material so that the Fresnel reflections from the two surfaces of the window destructively interfere. By this arrangement, the total transmission is increased and the window functions as if the surfaces had been provided with a dielectric antireflection coating.

In the prior art, it was known that at a given wavelength, the transmission of a material will vary with the thickness of the material. This phenomenon is known as the etalon effect. Etalons have been used in lasers as a means for selecting operation at a single, desired wavelength. However, it is believed that the etalon effect has never been used to maximize transmission through a sealed window in a hollow delivery device.

Figure 2:
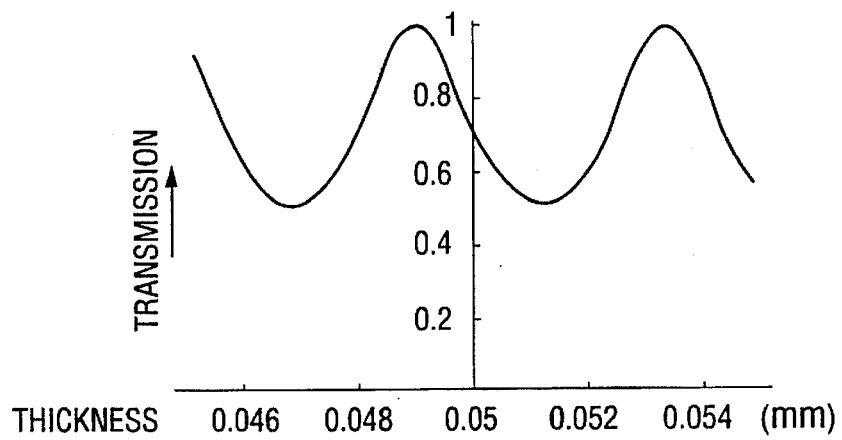
Figure 3:
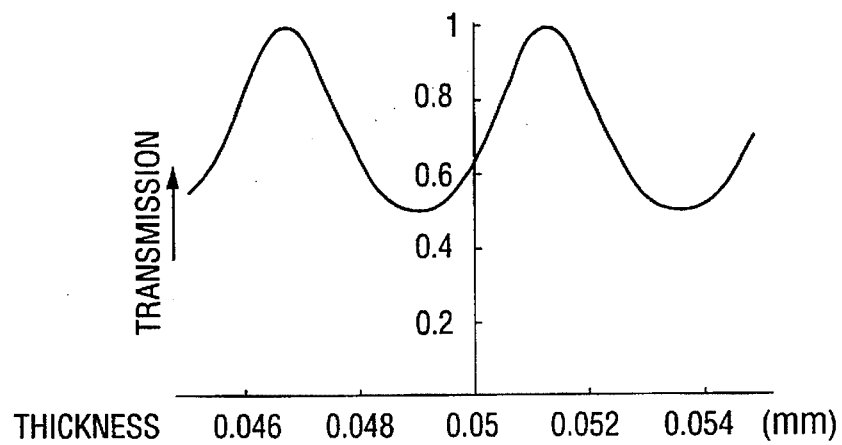
Figure 4:
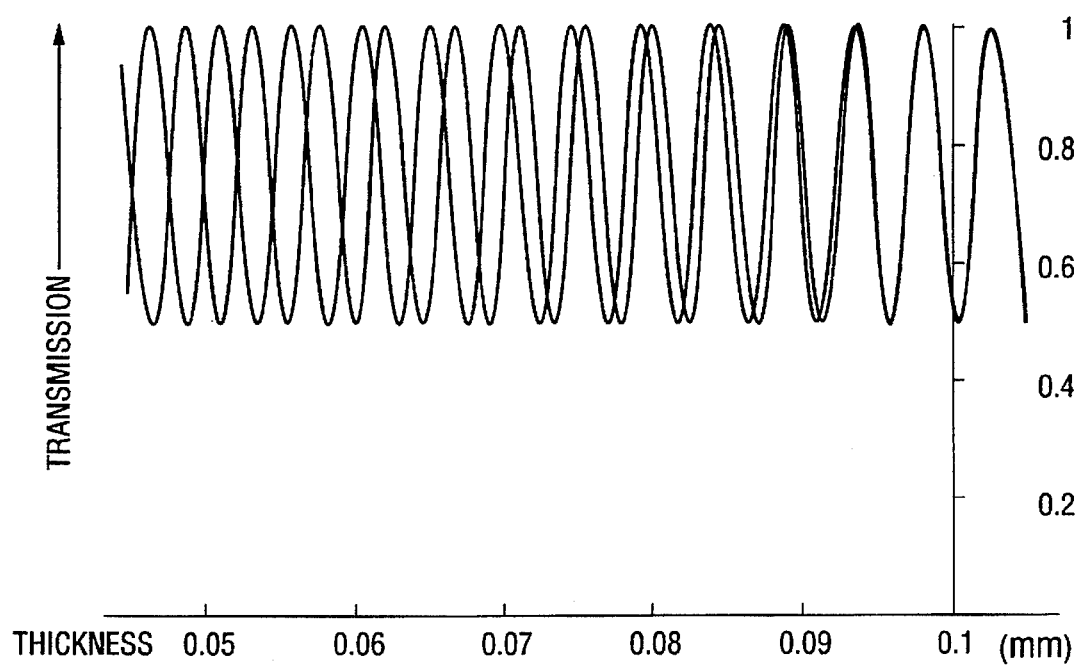

Further objects and advantages will become apparent from the following detailed description taken in conjunction with the drawings, in which:

BRIEF DESCRIPTION OF THE DRAWINGS

FIG. 1 is a schematic diagram of a delivery device formed in accordance with the subject invention.

FIG. 2 is a graph plotting the transmission through an uncoated diamond window as a function of the thickness of the window for light having a wavelength of 10.6 microns.

FIG. 3 is a graph plotting the transmission through an uncoated diamond window as a function of the thickness of the window for light having a wavelength of 11.1 microns.

FIG. 4 is a graph plotting the transmission through an uncoated diamond window as a function of the thickness of the window for light at both 10.6 and 11.1 microns.

DETAILED DESCRIPTION OF THE PREFERRED EMBODIMENTS

Turning to FIG. 1, there is illustrated a device 10 for channeling light 12 from a laser 14 to a target 16. Device 10 includes an elongated, hollow, tubular member 20. The subject invention is intended to be used in any of the variety of hollow delivery devices that are well known in the art. These delivery devices include hollow waveguide devices of the type disclosed in U.S. Pat. Nos. 4,917,083; 4,652,083 and 4,688,893. The subject invention can also be used in non-waveguide channels, where the light is focused down the channel.

As in each of the devices discussed above, member 20 includes an input end 22 for receiving the laser beam. The beam is channeled along the length of member 20 to a delivery end 24.

In accordance with the subject invention, the delivery end 24 of member 20 is sealed with a window 30 which functions to prevent contaminants from entering member 20 through the delivery end thereof. The means for sealably mounting the window will vary based on the materials used to form member 20 and window 30. For example, if member 20 is formed from a ceramic material, window 30 could be brazed into place. Alternatively, if member 20 is formed from a metal such as aluminum, window 30 could be mounted by crimping the aluminum around the edges of the window. In any case, a fluid tight, thermally conductive seal is desired.

The material selected to form window 30 must have a low level of absorption at the laser wavelength generated by laser 14. In addition, the material should have good thermal properties such as thermal conductivity and stability and strength at high temperatures. In accordance with the subject invention, these criteria are met by forming window 30 from a crystalline material. Suitable materials include sapphire, YAG (yttrium-aluminum-garnet) and diamond.

The crystalline material selected should be matched to the wavelength of light generated by the laser. For example, sapphire and YAG have excellent transmission characteristics in the 1.0 to 6.0 micron range. Diamond has excellent transmission characteristics up to 20 microns. For this reason, diamond is a good choice for a window material when using carbon dioxide lasers which have an output wavelength in the 10–11 micron regime. Since the availability of solid fibers which are capable of delivering 10 micron radiation is very limited, the subject invention will have the most utility with carbon dioxide lasers where the delivery system often includes a hollow fiber.

As noted above, while the crystalline materials have excellent thermal properties and low absorption, they also tend to have relatively high losses from Fresnel reflections. These reflections occur at the front and rear plane parallel surfaces (32, 34) of the window 30. In accordance with the subject invention, this problem is overcome by properly selecting the thickness of the window so that these reflections destructively interfere thereby reducing reflection losses and increasing transmission. In this manner, there is no need to use fragile dielectric antireflection coatings.

As noted above, for a given wavelength, the transmission/reflection characteristics of a transparent, plane parallel optical device will vary with the thickness of the device. An optical device which operates on this principal is called an etalon. Etalons are used within a laser for wavelength selection.

FIG. 2 illustrates the variation in transmission through an uncoated diamond window as function of thickness at a wavelength of 10.6 microns which is the standard output for a carbon dioxide lasing medium. As can be seen, the transmission varies periodically from a low point of close to fifty percent transmission to a high point of one hundred percent transmission. At the higher levels of transmission, the Fresnel reflections from the front and rear surfaces 32, 34 of window 30 will destructively interfere. In accordance with the subject invention, the thickness of window 30 is selected in order to enhance the destructive interference between the Fresnel reflections thereby increasing the transmission through the window.

Since the transmission curve varies periodically there will be a number of discrete thicknesses at which the transmission can be maximized. It should also be noted that the difference in thickness between the maximum transmission level and the minimum transmission level is less than 3 microns. Therefore, in order to fabricate a window with enhanced transmission characteristics, manufacturing tolerances on the order of at least ±1.0 microns will need to be observed for the window thickness. Fortunately, since the preferred crystalline materials are very sturdy and hard, such tight tolerances can be achieved using precision grinding techniques.

In some of the medical lasers manufactured and sold by the assignee herein, the $C^{13}$ isotope of carbon dioxide is used as the lasing gas. The $C^{13}$ isotope emits a wavelength of 11.1 microns.

FIG. 3 is a graph, similar to FIG. 2, which illustrates the transmission curve through a diamond window at 11.1 microns. As can be seen, the transmission through the window varies periodically in a manner analogous to the light at 10.6 microns. However, the peaks and valleys in FIGS. 2 and 3 do not coincide at the same thicknesses. Thus, a window having a thickness of 0.049 mm will provide maximum transmission at 10.6 microns and minimum transmission at 11.1 microns. Similarly, if the window thickness of 0.051 mm were selected to maximize transmission at 11.6 microns, high losses would occur at 10.6 microns.

FIG. 4 is provided to illustrate that it is possible to select a window thickness that would be highly transmissive at two or more distinct wavelengths. FIG. 4 illustrates the transmission curves over a wider range of thicknesses than in FIGS. 2 and 3, with one curve representing 10.6 microns and the other curve representing 11.1 microns. As can be seen, there exits a region wherein the peaks in transmission for both wavelengths overlap. This region of overlap begins at a thickness of about 0.90 mm, with the maximum overlap of the peaks occurring at 0.1 mm. Regions wherein the peaks overlap will recur at discrete thickness intervals, much like the beat frequency of two different notes. For example, another region of overlap will occur at a thickness of 0.2 mm (not shown). By selecting a window thickness from one of the overlap regions, it is possible to configure the mirror to have minimum reflectance losses at more than one wavelength without any antireflection coatings.

From a computational standpoint, the overlap regions occur when the thickness T is equal to both:

(1) $r\lambda_1/2n_1$ and (2) $s\lambda_2/2n_2$ where r and s are integers, $\lambda_1$ and $\lambda_2$ are the two wavelengths and $n_1$ and $n_2$ are the refractive indices at the two wavelengths. A delivery device formed based on these criteria could be used equally well with a laser having a standard $C^{12}$ carbon dioxide lasing medium or a laser with an isotopic $C^{13}$ gas as the lasing medium.

A delivery device formed in accordance with the subject invention will have a number of advantages. More specifically, window 30 will eliminate the need to have a purge gas used in the hollow member 20. By this arrangement, no vision obscuring bubbles will be created if the procedure is performed in a liquid environment. Moreover, by selecting a hard, inert, crystalline material, the device should have a long life and not create any problems with toxicity. Finally, by proper selection of the thickness of the window, reflections losses can be reduced thereby maximizing the power delivered to the target.

While the subject invention has been described with reference to the preferred embodiments, various changes and modifications could be made therein, by one skilled in the art, without varying from the scope and spirit of the subject invention as defined by the appended claims.

I claim:

1. A device for channeling a laser beam having a wavelength comprising:

an elongated tubular member having an input end and a delivery end, said tubular member being configured to channel a laser beam from the input end to the delivery end; and a window mounted within the tubular member near the delivery end thereof, said window forming a seal preventing fluids from entering the tubular member from the delivery end, with the thickness of said window being selected to reduce reflection losses at the wavelength of the laser beam thereby increasing the transmission of the laser beam through the window.

2. A device as recited in claim 1 wherein the thickness of the window is selected to increase the transmission of the window at two different wavelengths.

3. A device as recited in claim 2 wherein said two different wavelengths are 10.6 and 11.1 microns.

4. A device as recited in claim 2 wherein the thickness of the window is substantially equal to both $r\lambda_1/2n_1$ and $s\lambda_2/2n_2$ wherein r and s are integers, $\lambda_1$ and $\lambda_2$ are the two different wavelengths and $n_1$ and $n_2$ are the refractive indices at the two different wavelengths with respect to the material forming the window.

5. A device as recited in claim 1 wherein said window is formed from a crystalline material.

6. A device as recited in claim 1 wherein the window is formed from a material selected from the group consisting of sapphire, YAG and diamond.

7. A device for channeling a laser beam having a wavelength comprising:

an elongated tubular member having an input end and a delivery end, said tubular member being configured to channel a laser beam from the input end to the delivery end; and a window mounted within the tubular member near the delivery end thereof, said window forming a seal preventing fluids from entering the tubular member from the delivery end, said window having plane parallel faces and with the thickness of said window being selected to increase the destructive interference effects associated with the reflectance of light off the faces of the window at the wavelength of the laser beam thereby increasing the transmission of the laser beam through the window.

8. A device as recited in claim 7 wherein the thickness of the window is selected to increase the transmission of the window at two different wavelengths.

9. A device as recited in claim 8 wherein said two different wavelengths are 10.6 and 11.1 microns.

10. A device as recited in claim 8 wherein the thickness of the window is substantially equal to both $r\lambda_1/2n_1$ and $s\lambda_2/2n_2$ wherein r and s are integers, $\lambda_1$ and $\lambda_2$ are the two different wavelengths and $n_1$ and $n_2$ are the refractive indices at the two different wavelengths with respect to the material forming the window.

11. A device as recited in claim 7 wherein said window if formed from a crystalline material.

12. A device as recited in claim 7 wherein the window is formed from a material selected from the group consisting of sapphire, YAG and diamond.

13. A device for channeling a laser beam having a wavelength comprising:

an elongated tubular member having an input end and a delivery end, said tubular member being configured to channel a laser beam from the input end to the delivery end; and a window formed from a crystalline material and being mounted within the tubular member near the delivery end thereof, said window forming a seal preventing fluids from entering the tubular member from the delivery end, said window having plane parallel faces and with the thickness of said window being selected to increase the destructive interference effects associated with the reflectance of light off the faces of the window at the wavelength of the laser beam thereby increasing the transmission of the laser beam through the window.

14. A device as recited in claim 13 wherein the thickness of the window is selected to increase the transmission of the window at two different wavelengths.

* * * * *